(12) United States Patent
Goessl et al.

(10) Patent No.: US 10,760,007 B2
(45) Date of Patent: Sep. 1, 2020

(54) SYSTEM FOR RECLAIMING LIQUEFIED PETROLEUM GAS

(71) Applicant: WORTHINGTON INDUSTRIES, INC., Columbus, OH (US)

(72) Inventors: Michael Joseph Goessl, Valders, WI (US); Isaac Ray Ainsworth, Chilton, WI (US); Jeremiah Hurst, Green Bay, WI (US); Jay Alan Haddock, Campbellsport, WI (US); James Norman Rettler, Campbellsport, WI (US); Jody Alan McKinley, Mount Vernon, OH (US)

(73) Assignee: WORTHINGTON INDUSTRIES, INC., Columbus, OH (US)

( * ) Notice: Subject to any disclaimer, the term of this patent is extended or adjusted under 35 U.S.C. 154(b) by 238 days.

(21) Appl. No.: 15/769,638

(22) PCT Filed: Apr. 7, 2017

(86) PCT No.: PCT/US2017/026578
§ 371 (c)(1),
(2) Date: Apr. 19, 2018

(87) PCT Pub. No.: WO2017/177123
PCT Pub. Date: Oct. 12, 2017

(65) Prior Publication Data
US 2018/0312763 A1    Nov. 1, 2018

Related U.S. Application Data

(60) Provisional application No. 62/319,452, filed on Apr. 7, 2016.

(51) Int. Cl.
*B65B 31/00*    (2006.01)
*C10G 31/06*    (2006.01)
(Continued)

(52) U.S. Cl.
CPC ............. *C10G 31/06* (2013.01); *C10G 53/00* (2013.01); *C10G 71/00* (2013.01); *C10G 99/00* (2013.01);
(Continued)

(58) Field of Classification Search
CPC .. C10G 31/06; F17C 2221/035; B09B 3/0058
See application file for complete search history.

(56) References Cited

U.S. PATENT DOCUMENTS 3,266,261 A    8/1966   Anderson
5,322,092 A *   6/1994   Howeth .................... F17C 5/02
                                                                     137/614
(Continued)

FOREIGN PATENT DOCUMENTS

CN            104390425         3/2015

OTHER PUBLICATIONS

International Search Report; PCT/US17/26578; dated Aug. 25, 2017; 3 pgs.
(Continued)

*Primary Examiner* — Reinaldo Sanchez-Medina
(74) *Attorney, Agent, or Firm* — Tucker Ellis LLP; Carlos Garritano

(57) ABSTRACT

An LPG reclaim system for withdrawing and reclaiming liquefied petroleum gas (LPG) from an unspent LPG cylinder. The reclaim system has a reclaim station for reclaiming unspent LPG from LPG bottle containers, a compressor for applying a vacuum on the reclaim station and pressurizing LPG vapor from the reclaimed LPG fluid, and a receiving tank for receiving a stream of pressurized liquid LPG. The reclaim system has a pair of shell-and-tube heat exchangers include cold-side tubes and a hot side shell. The reclaimed LPG fluid is passed through the cold-side tubes, while the pressurizing LPG vapor is passed through the hot-side shell
(Continued)

of the heat exchanger. The heat applied to the cold-side reclaimed LPG fluid promotes evaporation of the LPG fluid to LPG vapor for pressurizing, and the cooling applied to the hot-side pressurized LPG vapor promotes condensation of the LPG vapor to LPG liquid for the refill containers.

13 Claims, 8 Drawing Sheets

(51) Int. Cl.
| | |
|---|---|
| *F17C 7/04* | (2006.01) |
| *F17C 13/00* | (2006.01) |
| *C10G 99/00* | (2006.01) |
| *C10G 71/00* | (2006.01) |
| *C10G 53/00* | (2006.01) |
| *F17C 9/02* | (2006.01) |
| *C10L 3/12* | (2006.01) |
| *F17C 13/02* | (2006.01) |
| *F25J 1/00* | (2006.01) |
| *F25J 1/02* | (2006.01) |

(52) U.S. Cl.
CPC ...... *C10L 3/12* (2013.01); *F17C 7/04* (2013.01); *F17C 9/02* (2013.01); *F17C 13/00* (2013.01); *F17C 13/025* (2013.01); *F25J 1/0025* (2013.01); *F25J 1/0201* (2013.01); *C10L 2290/06* (2013.01); *C10L 2290/46* (2013.01); *F17C 2205/0314* (2013.01); *F17C 2205/0335* (2013.01); *F17C 2221/035* (2013.01); *F17C 2223/0153* (2013.01); *F17C 2223/033* (2013.01); *F17C 2227/0121* (2013.01); *F17C 2227/0157* (2013.01); *F17C 2227/03* (2013.01); *F17C 2227/0306* (2013.01); *F17C 2227/0339* (2013.01); *F17C 2227/044* (2013.01); *F17C 2227/045* (2013.01); *F17C 2260/048* (2013.01); *F17C 2270/0709* (2013.01); *F17C 2270/0745* (2013.01); *F25J 2210/90* (2013.01); *F25J 2215/64* (2013.01); *F25J 2270/02* (2013.01)

(56) References Cited

U.S. PATENT DOCUMENTS

| | | | |
|---|---|---|---|
| 5,441,088 | A | 8/1995 | O'Neill |
| 7,434,506 | B2 * | 10/2008 | Wilson ............... F02M 21/00 100/102 |
| 7,721,557 | B1 | 5/2010 | Stearns |
| 2007/0062605 | A1 | 3/2007 | Wilson |
| 2009/0183797 | A1 | 7/2009 | Hilliard, Jr. |
| 2010/0056648 | A1 | 3/2010 | Schroer |

OTHER PUBLICATIONS

Written Opinion of the International Searching Authority dated Aug. 25, 2017; PCT/US17/26578.

* cited by examiner

SYSTEM FOR RECLAIMING LIQUEFIED PETROLEUM GAS

CROSS-REFERENCE TO RELATED APPLICATION

This application claims the benefit of U.S. Provisional Application 62/319,452, filed Apr. 7, 2016, the disclosure of which is incorporated by reference in its entirety.

TECHNICAL FIELD

This application relates generally to systems for reclaiming liquefied petroleum gas, and more particularly, to systems for reclaiming residual liquefied petroleum gas in used and discarded containers, or from new and discarded containers/pressure vessels.

BACKGROUND

Liquefied petroleum gas, e.g., propane or butane, has many uses, which include fuel and heating appliances, cooking equipment and vehicles, including for example, for camping accessories such as stoves, lanterns, and generators of recreational vehicles, and for use by homeowners and proprietors of commercial establishments, for a variety of purposes. Propane and various blends of propane are generally stored in small steel or aluminum bottle containers, which include a discharge valve for fluidly connecting the bottle with lanterns, camp stoves, camping heaters, and similar propane-burning devices. The propane is stored in the bottle under high pressure in a liquid state, typically up to about 150-200 psig. Because propane has a boiling point of −44° Fahrenheit (−42° C.), the liquid propane vaporizes into a propane gas as it exits the bottle. Although there are refillable propane tanks, the typical propane bottle is a DOT 39 cylinder. DOT 39 cylinders are non-refillable, and they must meet certain criteria (for example, ability to withstand the high pressure) established by the Department of Transportation.

Such small LPG bottles are popular among campers, and are used as fuel for a variety of camping accessories. A camper may discard LPG containers after use, when the camper perceives the LPG container(s) to be empty, or at least substantially empty. Substantial numbers of used LPG containers can be discarded each year in recreational areas such as parks, and can result in very large accumulations of the containers. Such LPG and propane bottles pose special problems because if punctured, they could explode, and they cannot be composted along with other, compostable garbage. For example, past reports by one U.S. national park showed an accumulation of tens of thousands of used and discarded propane cylinders, which can create environmental, health and safety hazards.

It can be appreciated that it can be advantageous to extract, or reclaim, the propane from used and discarded containers. It can also be advantageous to recycle the discarded containers, after reclaiming the propane.

U.S. Pat. No. 7,434,506 (Wilson), the disclosure of which is incorporated by reference in its entirety, describes a system for recycle of such bottles. Nevertheless there remains a need to provide for recovery of propane, butane and other LPGs from such bottle containers that is safer, more effective, and more efficient.

SUMMARY OF THE INVENTION

The present invention provides an LPG reclaim system for withdrawing and reclaiming liquefied petroleum gas (LPG) from an LPG cylinder, comprising: a) a reclaim station for reclaiming a LPG in a liquid form from a plurality of fuel bottle containers, b) a compressor for pressurizing LPG in a vapor form from the reclaimed LPG fluid, c) a receiving tank for receiving a stream of pressurized LPG in a liquid form, d) one or more heat exchangers that include a cold side and a hot side, e) a cold-side flow system, connecting the reclaim station to an inlet of the compressor, and passing the reclaimed fuel as a cold-side fluid through the cold side of the one or more heat exchangers, and f) a hot-side flow system, connecting an outlet of the compressor to the receiving tank, and passing the pressurized fuel vapor as a hot-side fluid through the hot side of the one or more heat exchangers, wherein heat from a hot-side LPG fluid on the hot side of the one or more heat exchangers passes to a cold-side LPG fluid on the cold side of the one or more heat exchangers, wherein the heat transferred from the hot-side LPG fluid to the cold-side LPG fluid condenses the pressurized LPG vapor into a liquefied LPG that fills the receiving tank.

In an embodiment of the invention, the temperature reduction of the fuel fluid in the hot side stream that passes from an inlet to the outlet of the hot side of the heat exchanger is at least 5° F. The temperature rise of the fuel fluid in the cold side stream that passes from an inlet to the outlet of the cold side of the heat exchanger is at least 5° F. In alternative embodiments, the temperature reduction of the hot-side fuel fluid in the hot side stream that passes from an inlet to the outlet of the hot side of the heat exchanger is at least 10° F., and more particularly at least 15° F., and even more particularly at least 20° F. The temperature rise of the cold-side fuel fluid in the cold side stream that passes from an inlet to the outlet of the cold side of the heat exchanger is at least 10° F., and more particularly at least 15° F., and even more particularly at least 20° F.

In an embodiment of the invention, the one or more heat exchangers includes two or more heat exchangers, wherein the cold-side fuel fluid passes in series through the cold sides of the two or more heat exchangers, and wherein the hot-side fuel fluid passes in series through the hot sides of the two or more heat exchangers.

In an embodiment of the invention, the one or more heat exchangers comprise a shell-and-tube heat exchanger including a tube side and a shell side, wherein the cold-side fuel fluid passes through the tube side of the shell-and-tube heat exchanger, and the hot-side fuel fluid passes through the shell side of the shell-and-tube heat exchanger. In another embodiment, the cold-side fuel fluid passes through the shell side of the shell-and-tube heat exchanger, and the hot-side fuel fluid passes through the tube side of the shell-and-tube heat exchanger.

In another embodiment, the cold-side flow system includes a) a manifold for receiving a reclaimed quantity of LPG fluid from one or more of the plurality of LPG bottle containers, b) a vertical float tank that includes a lower volume portion for the collection of LPG in liquid form that collects by gravity, and an upper volume portion for the collection of LPG in vapor form, and a vapor outlet tube in fluid communication with the upper volume portion, c) piping for connecting the manifold to an inlet of the cold side of the one or more heat exchangers, for connecting an outlet of the cold side of the one or more heat exchangers to an inlet of the vertical float tank, and for connecting an vapor outlet tube of the vertical float tank to the compressor.

The cold-side flow system can further include one or more fluid separation tanks having a volume and configured to separate a liquid portion of the fuel that collects under gravity in a lower portion of the volume of the fluid separation tank, from a vapor portion of the fuel in an upper portion of the volume of the fluid separation tank, and connecting the upper portion of the volume of the fluid separation tank to an inlet of a compressor, and optionally including c) one or more check valves to permit fluid flow only in the piping in the direction from the manifold to the inlet of the compressor.

In another embodiment, the hot-side flow system includes piping for connecting the outlet of the compressor to an inlet of the hot side of the one or more heat exchanger, for connecting the outlet of the hot side of the one or more heat exchanger to a filling manifold, and for connecting the filling manifold to one or more fuel receiving tanks.

In another embodiment, the reclaim system includes a support platform that includes a support body having a plurality of bottle stations for mounting inverted bottle containers, wherein an outlet valve of the one or more bottle containers is retained in one of a plurality of openings in the support platform that define a plurality of bottle stations. The reclaim system also includes a plurality of adapters fastened to the support platform, and configured to accept and support a main valve housing of the inverted bottle container. The adapter includes an evacuation needle that can extend into a passage within the main valve housing of the inverted bottle container for draining LPG fluid from inside the bottle container.

In an embodiment of the invention, the support platform can also include a reclaim heat exchanger. The reclaim heat exchanger includes a length of a coil passing proximate to the bottle stations of the support platform. The coil is configured and shaped to pass near or around the openings in the support platform. An inlet end and an outlet end of the coil is placed into fluid communication with the hot-side flow system, for passing hot-side LPG through the coil. In operation, heat from the hot-side LPG fluid flowing through the coil passes into and heats the support platform proximate the plurality of openings.

In another embodiment of the invention, each of the cold-side flow system and the hot-side flow system can further include at least one of a pressure switch or a pressure transducer configured to detect a pressure or vacuum of the LPG fluid, wherein the pressure switch or the pressure transducer can be configured to account for the altitude of the location of the LPG reclaim system.

DETAILED DESCRIPTION OF THE INVENTION

As used herein, the phrases hot-side (LPG) flow system and hot-side (LPG) fluid, can also be referred to or renamed as warm-side (LPG) flow system and warm-side (LPG) fluid, or pressurized-side (LPG) flow system and pressurized-side (LPG) fluid, or LPG refill flow system and LPG refill fluid, while the phrases cold-side (LPG) flow system and cold-side (LPG) fluid, can also be referred to or renamed as cool-side (LPG) flow system and cool-side (LPG) fluid, or vacuum-side (LPG) flow system and vacuum-side (LPG) fluid, or LPG reclaim flow system and LPG reclaim fluid.

Figure 1:
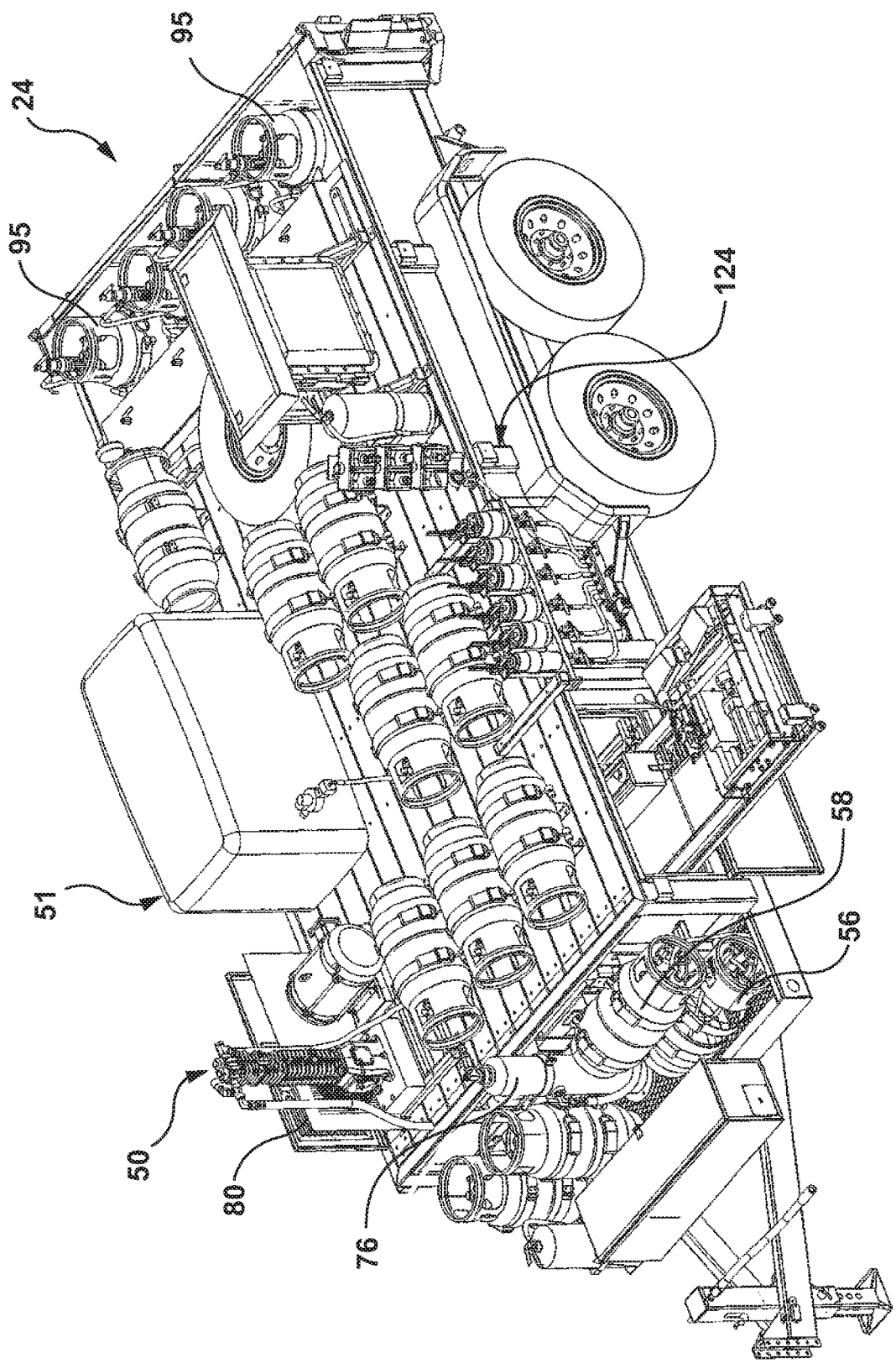
FIG. 1 shows a perspective view of a trailer that supports a reclaim system mounted on the trailer for reclaiming liquid petroleum gas from unused and unspent fuel cylinders.
Figure 2:
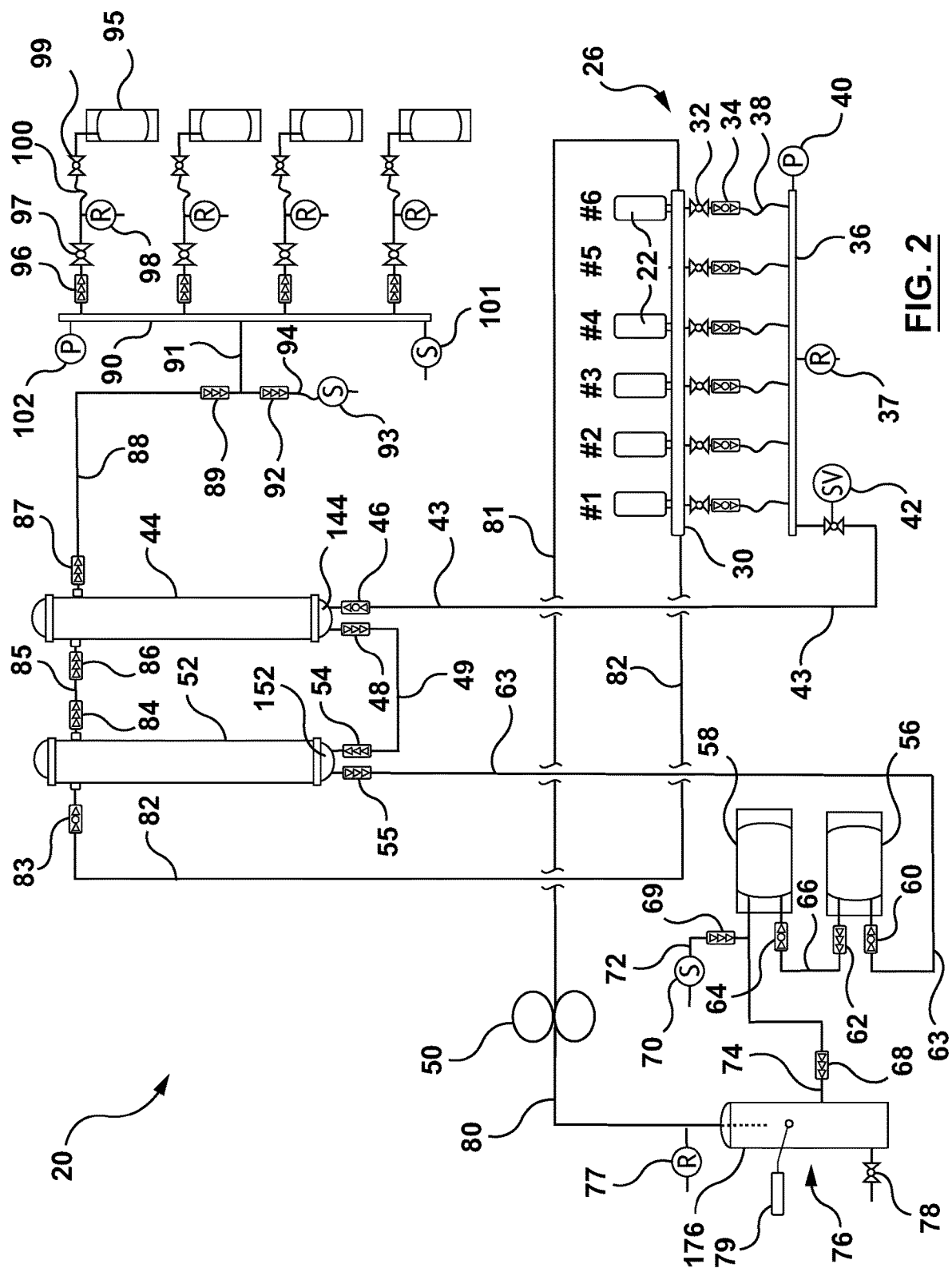
FIG. 2 shows a schematic representation of the reclaim system for reclaiming liquefied petroleum gas (LPG), according to one embodiment.

Referring now to the drawings, wherein like reference numbers indicate the same or corresponding elements throughout the views. FIG. 1 shows a mobile reclaim trailer 24 that carries a reclaim system 20 for reclaiming liquefied, or liquid, petroleum gas (LPG) that includes a reclaim station 124, a pair of LPG separation tanks 56,58, a float tank 76 connected with a conduit 80 to a compressor 50, a generator 51, and other devices, instruments and fittings of the reclaim station 124. FIG. 2 schematically depicts the reclaim system 20 according to one embodiment. The system 20 mounted on the trailer 24 can be transported from one location to another, which can be advantageous in certain applications. In other embodiments, the system 20 can be mounted on a stationary structure, such as a platform or foundation, or can be supported directly by the ground. The stationary structure can also be transported to other locations. The LPG containers 22, containing unspent LPG, can be either new or partially used containers, such as may be discarded by campers when their camping event has ended though the container still contains a residual amount of the liquid petroleum gas (LPG), for example, propane, butane or propylene.

A plurality of bottle containers 22 are associated with system 20, and are typically cylindrical and contain residual or unspent LPG, such as propane or propylene. Propane containers used for camping are typically relatively small, and can be sized to contain, for example, about 14—16 ounces by weight of LPG. However, the system 20 can be used to reclaim, or recover, LPG from larger containers. It can be advantageous to reclaim the LPG, e.g., propane, by withdrawing or extracting the LPG from the unspent containers 22 and transferring the LPG to larger receiving containers or fill tanks 95, which can be relatively larger containers, for subsequent use in other applications, for example, for subsequent usage to power generators or vehicles such as forklifts, or for use with any appliance that is designed for use with the LPG. After the LPG has been reclaimed, i.e., after the LPG has been transferred from the discarded cylinders 22 to the fill tanks 95, the emptied containers 22 can be recycled. Recycling the emptied, discarded containers safely consists of piercing or puncturing the emptied container 22, in order to vent the emptied container to prevent residual LPG vapors remaining within the container before recycling the metal bottle. After the emptied metal containers have been vented, they can be crushed and recycled. An apparatus can be disposed on the trailer 24, which can be used to pierce the emptied containers 22, and to subsequently crush them for recycle.

The reclaim system 20 includes a reclaim station 26 for reclaiming a volatile fuel (the LPG) from a plurality of fuel bottle containers 22. The reclaim system 20 also includes a compressor for pressurizing LPG vapor from the reclaimed quantity of volatile fluid. Connecting the reclaim system 20 to the inlet of the compressor 50 is a cold-side piping system.

Without being bound to any particular theory, at least two issues confront the operation of the reclaim system 20. First, the operation of the compressor 50 draws a vacuum upon the cold-side piping system. The vacuum reduces the absolute pressure on the cold-side piping system and increases the partial pressure of the LPG, thereby increasing the rate of evaporation of any liquid LPG in the cold-side system, including within the unspent LPG containers 22 which has been placed into fluid communication with the cold-side piping system. The rapid evaporation of LPG liquid through the discharge valve of the LPG container 22 results in a significant drop in temperature at the discharge valve. In most weather conditions, moisture in the atmosphere condenses and then frosts and/or freezes on the outside of the discharge valve and lower end of the inverted bottle container 22. Excessive reduction in the temperature at the discharge valve of the LPG container 22 likewise reduces the temperature of the unspent liquid LPG within the container 22, which in turn reduces the evaporation rate of the LPG fuel. The LPG fluid discharged from the unspent bottle containers is typically a mixed phase of volatile vapor and liquid.

Second, once the LPG is withdrawn from the bottle containers 22, it is important to increase the temperature of the LPG fluid to increase the evaporation of LPG to vapor, to maintain an ample supply of volatile LPG to the inlet of the compressor 50. It is also important to avoid entry of any liquid into the compressor equipment.

On the other hand, once the LPG fluid has been compressed, both its pressure and its temperature are increased. High pressure increases the mass transfer rate of the LPG to the filling station. However, the temperature of the pressurized LPG needs to be reduced for the LPG fluid vapor to condense and flow as liquid into the fill containers 95.

To address these issues, the LPG fuel is reclaimed from the unspent containers 22 is passed on the cold side of one or more heat exchangers 44, while the hot, pressurized LPG from the compressor 50 is passed on the hot side of one or more heat exchangers 44. This results in heating and volatizing of the reclaimed LPG fuel to LPG vapor that is fed to the compressor 50, and in cooling and condensing of the pressurized LPG vapor discharged by the compressor 50, which is condensed and is collected mainly as liquid LPG in the fill containers 95.

Figure 3:
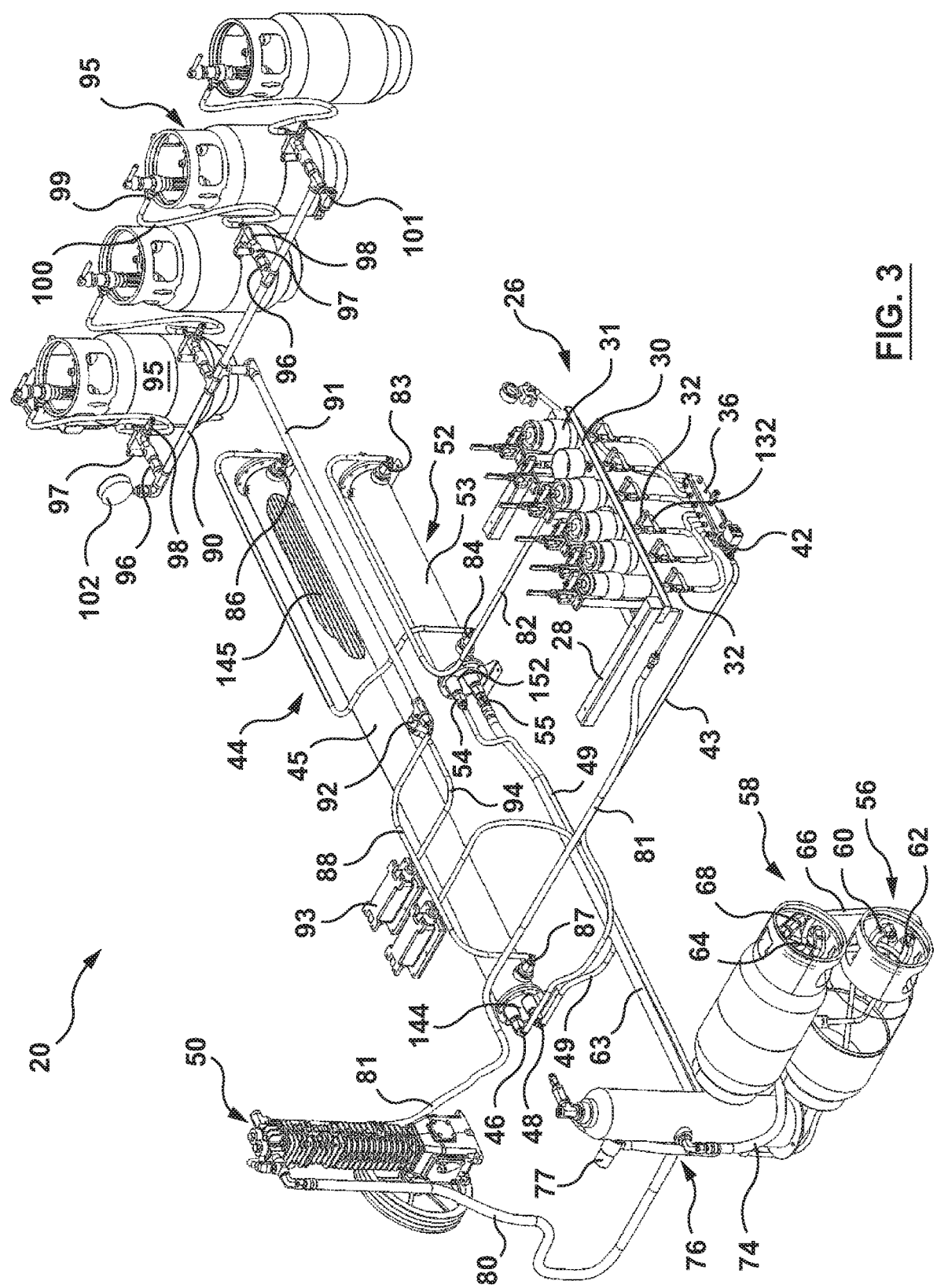
FIG. 3 shows a perspective view of the fluid handling equipment of the reclaim station.

System 20 includes a reclaim station 26. The containers 22 can be mounted on, and supported by, the reclaim station 26. FIGS. 2 and 3 illustrate six bottle containers 22 mounted in an inverted position at the reclaim station 26. However, more than six of the containers 22, or less than six of the containers 22, can be mounted on the reclaim station 26. The reclaim station 26 can include a mount structure, which can include one or more beams 28, and/or mount brackets or other suitable support structure, which can be used to attach the reclaim station 26 to the trailer 24. The reclaim station 26 can also include a support platform 30, a plurality of support posts 33, and a plurality of receptacles 31 connected to the support platform 30 and/or the support posts 33. The containers 22 can be inserted into or through the receptacles 31, with the outlet valve in the discharge end 23 of the inverted containers 22 extending downwardly into respective ones of a plurality of openings 25 formed in the support platform 30 (see also FIGS. 5 and 6). The reclaim station 26 can also include retention clamps 35 that can be are fixed to the support posts 33, which releasably engage a base end 21 of the inverted containers 22, to facilitate releasably retaining the containers 22 within the receptacles 31 of the reclaim station 26.

Figure 4:
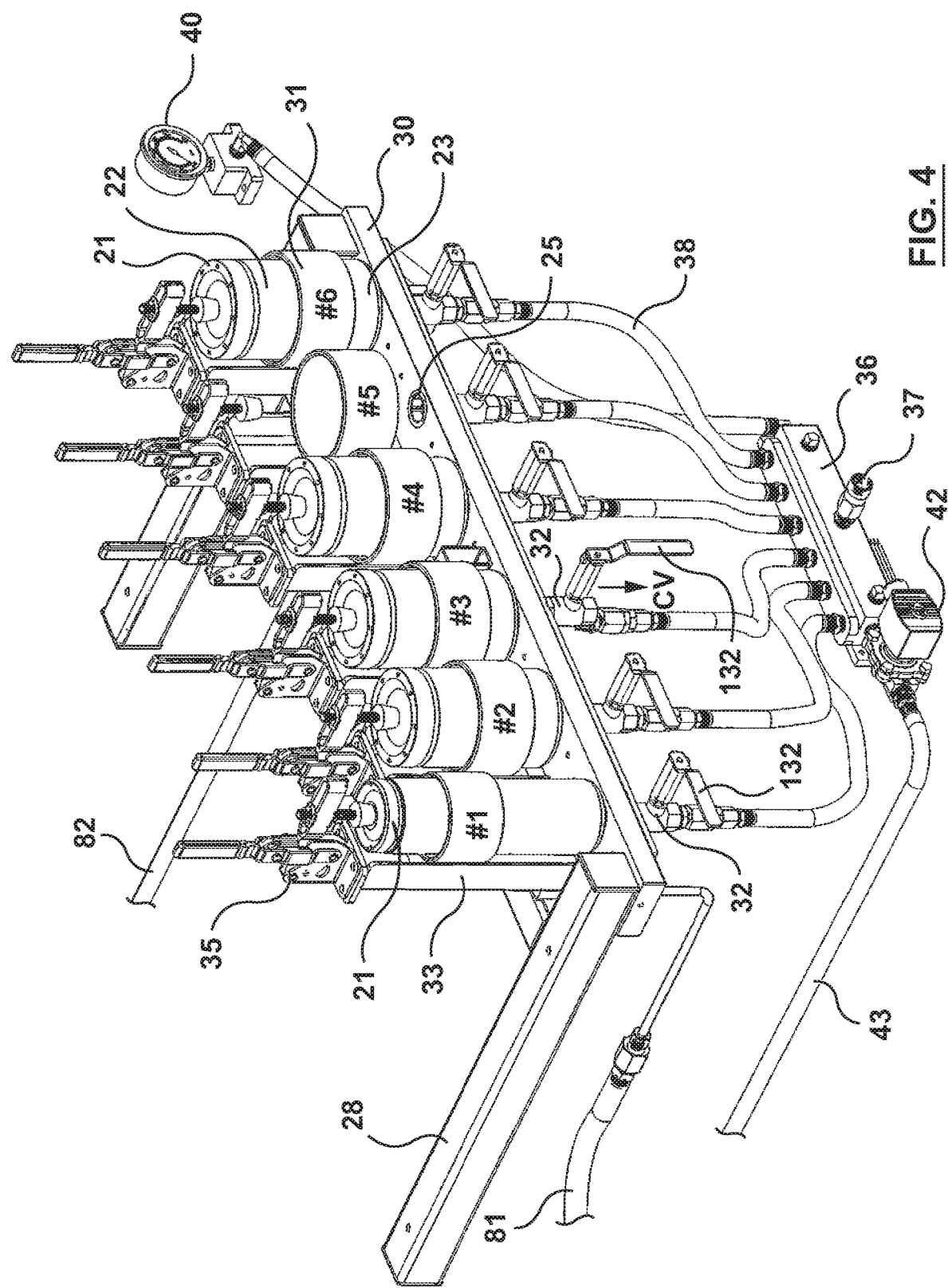
FIG. 4 shows a perspective view of a reclaim station of the system of FIG. 3 used for maintaining and emptying unused and unspent LPG cylinders.
Figure 5:
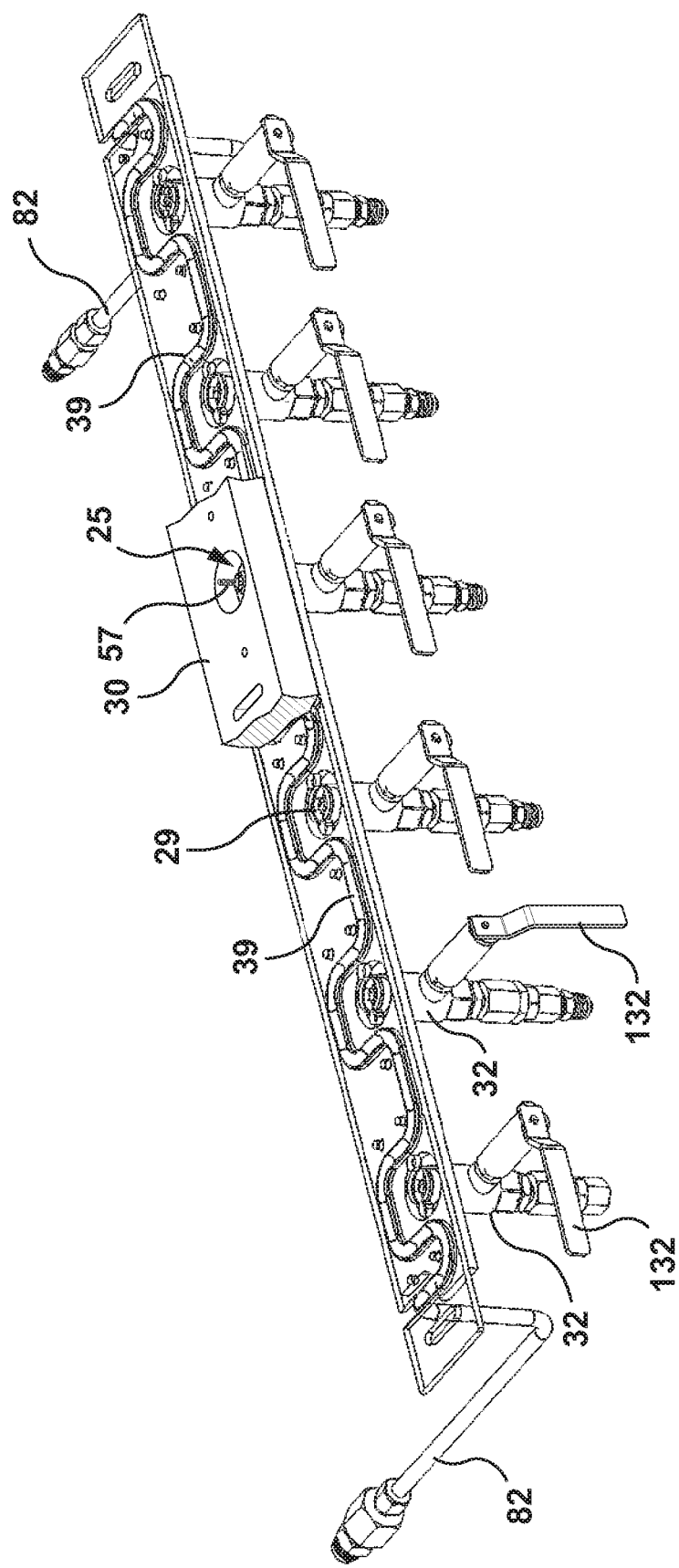
FIG. 5 shows a sectional view of a support platform of the reclaim station, but with an upper portion of the support platform omitted to illustrate a coil embedded in the support platform.

The reclaim station 26 can include a plurality of valves 32 (FIGS. 4-6) that can be manually operated valves, such as ball valves. An operator of the reclaim station 26 can position the handle 132 of a valve 32 of a plurality of bottle stations (#1 through #6) in a closed position, as shown in FIG. 3, when the system 20 is not being operated, and can position the handle 132 of a valve 32 to an open position, as shown in FIG. 5 at the second (#2) bottle station, during reclaim operation of system 20. In other embodiments, valves 32 can be other types of manually operated valves, or an automated valve, such as pneumatically-, hydraulically-, or electrically-operated valves, which can be manually movable or automatically or mechanically moveable. Each of the valves 32 can be placed into fluid communication with the interior volume of a respective one of the containers 22 through the outlet valve. The reclaim system 26 can also include a plurality of check valves 34, of a like number as the number of bottle stations. Each one of the check valves 34 can be connected to a respective one of the ball valves 32, and are oriented to allow any fluid flow in the direction CV, and to prevent LPG from "back-flowing" from the system 20 back through the valves 32 and toward the respective ones of the containers 22 when the valve(s) 32 are in the open position. It will be appreciated that, in some instances, the number of ball valves 32, check valves 34, and conduits 38, may be greater than the number of containers 22 mounted on the reclaim station 26, due to the ability of the reclaim station 26 to support additional containers. It will also be appreciated that the reclaim station 26 can support more than, or less than, six containers 22.

Each ball valve 32 and check valve 34 is fluidly connected to a manifold 36 through a discharge conduit 38. As a result, the manifold 36 can be in fluid communication with the containers 22 when the valves 32 are in the open position, fluidly isolated from the containers 22 when the valves 32 are in the closed position. The manifold 36 can include a pressure relief valve 37 that provides protection against over pressurization of fluid within the manifold 36, and a pressure gauge 40 that indicates the pressure within the manifold 36. An electrically operated valve 42, which can be an electrically-operated solenoid valve, can be connected to a discharge port in the manifold 36. The electrically-operated valve 42 can be configured to be closed when unpowered electrically, to isolate the reclaim station 26 from the rest of the system 20 when not operational, and to be opened when the system 20 is operational.

System 20 includes a first heat exchanger 44. In the illustrated embodiment, the heat exchanger 44 can be a multi-pass, and specifically a dual-pass, shell-and-tube type heat exchanger, having an external shell 45 and a plurality of tubes 145 disposed within and extending along the length of the shell 45. Each of the tubes 145 is in fluid communication with a fluid inlet and a fluid outlet of a tube-side header 144 of the heat exchanger 44. In other embodiments, the heat exchanger 44 can be a single pass type of shell-and-tube heat exchanger having an inlet tube-side header on one end of the shell, and an outlet tube-side header on the opposite end. Additionally, other types of heat exchangers, for example plate-type heat exchangers can be used.

An outlet of the manifold 36 is connected in fluid communication by piping 43 through the electrically operated valve 42, to the fluid inlet of the tube-side header 144 of the heat exchanger 44. A check valve 46 can be installed in the piping 43 at the tube-side fluid inlet of the heat exchanger 44, and is oriented to prevent fluid from flowing from the heat exchanger 44 in an upstream direction, back toward the reclaim station. An excess flow valve 48 can also be installed in the piping 43 at the tube-side fluid outlet of the heat exchanger 44. The excess flow valve 48 is normally open, but is configured to close if a fluid flow rate through the excess flow valve 48 exceeds a predetermined or preset value. Similar to check valves, excess flow valves can be directional, i.e., they can require installation in a particular orientation to achieve a desired result. Typically, excess flow valves are installed to protect against a failure of a component downstream of the excess flow valve, but in certain applications, they can be installed to protect against failure of a component that is upstream of the excess flow valve. In this instance, the excess flow valve 48 can protect against a failure of system 20 downstream of the excess flow valve 48 that would result is an excess, typically free and unrestricted fluid flow, for example, if a rupture in the piping 49 downstream of the excess flow valve 48 occurs.

The stream of cold-side LPG from the reclaim station that flows through the tubes 145 of the heat exchanger 44 is warmed by heat from a stream of hot-side LPG that flows through the shell-side of the heat exchanger 44, as will be subsequently described. This heating of the cold-side LPG, for example propane, flowing through the tubes 145 of the heat exchanger 44 can facilitate changing or shift the two-phase (liquid/vapor) state of the cold-side LPG toward a more vapor-rich phase state. Relatively warmer LPG flowing through the shell-side of the heat exchanger 44 is concurrently cooled by the relatively cooler LPG flowing through the tubes 145 of the heat exchanger 44, which desirably changes or shifts the two-phase (liquid/vapor) state of the hot-side LPG toward a more liquid-rich phase state. Since the hot-side LPG discharged from the shell-side of the heat exchanger 44 is eventually supplied to the fill tanks 95, the cooling of the LPG fluid and the shift to the more liquid-rich phase state helps to more rapidly condense the hot-side LPG and fill the fill tanks 95.

System 20 can include a second heat exchanger 52. The heat exchanger 52 likewise can be a multiple pass, shell-and-tube type heat exchanger, or can alternatively have a different configuration, as described for the first heat exchanger 44. The second heat exchanger 52 can be relatively larger, or smaller, in size and heat-transfer surface area, than the first heat exchanger 44. Piping 49 connects the tube-side fluid outlet of a tube-side header 144 of the heat exchanger 44 to the tube-side fluid inlet of a tube-side header 152 of the second heat exchanger 52.

Similar to the heat exchanger 44, the LPG flowing through the tubes 145 of the second heat exchanger 52 is heated by the hot-side LPG flowing within the shell 53, from the shell-side fluid inlet to the shell-side fluid outlet, of the heat exchanger 52. Concurrently, the hot-side LPG flowing through within the shell 53 is cooled. The additional heating and temperature increase of the cold-side LPG further shifts the two-phase (liquid/vapor) state of the cold-side LPG toward a more vapor-rich phase state, while heat removal from and temperature reduction of the hot-side LPG further shifts the two-phase (liquid/vapor) state of the hot-side LPG toward the more liquid-rich phase state.

One or more excess flow valves 48,54 can be installed into the piping 49. Excess flow valve 55 can be installed in the piping 63 after the tube-side fluid outlet of the heat exchanger 52.

System 20 can also include a first lower separation tank 56 and a second upper separation tank 58 in the cold-side fluid system. In other embodiments, for example system 120 depicted in FIG. 8, the separation tanks 56 and 58 can be omitted. A check valve 60 can be connected to a fluid inlet of the lower separation tank 56, and can be oriented to prevent cold-side LPG from flowing from the lower separation tank 56 in the upstream direction. An excess flow valve 62 can be connected to a fluid outlet of the lower separation tank 56 in the piping 66 leading to a fluid inlet of the upper separation tank 58. An excess flow valve 64 can be installed in the piping 66 before the fluid inlet of the upper separation tank 58, while another excess flow valve 68 can be installed into the piping 74 leading from the fluid outlet of the upper separation tank 58.

A pressure switch 70 (S) can be installed into the piping 74 at the fluid outlet of the upper separation tank 58, along with an excess flow valve 69. The pressure switch 70 can be set at a relatively low, predetermined pressure. For example, by way of illustration and not of limitation, the pressure switch 70 can be set to about minus 10 psig. If the pressure of the LPG is less than the predetermined set point of the pressure switch 70, the pressure switch 70 can open. This can turn off the compressor 50, such that the system 20 shuts down. When the pressure switch 70 senses an excessive vacuum, it can be an indication that the unspent cylinders 22 in the reclaim station 26 are empty, and that it is no longer necessary to keep the compressor 50 on and pumping. When the compressor 50 shuts down, an operator of system 20 is provided an indication that the containers 22 can be empty.

Each of the lower and upper separation tanks 56,58 define an interior space, and each include a vapor conduit (not shown) in fluid communication with the respective fluid outlets of the tanks. Each of these vapor conduits has an open inlet and that is positioned within the interior space, above the bottom or lower portion of the volume of the tanks where any liquid would accumulate by gravity. The vapor conduit has an outlet in fluid communication with the fluid outlet of the respective separation tank. As a result of this configuration of the tanks 56,58, even though cold-side LPG may enter the tank 56 in a two-phase state with both liquid and vapor LPG, the liquid portion of the LPG is retained in the bottom portion of the tanks 56,58, while the vapor phase flows out through the conduit and fluid outlet of the tanks 56,58. The separation tanks 56,58 also provide a volume space for the cold-side LPG in the system 20, which increases the amount of liquid-phase surface area of the LPG fluid, and thereby increases the mass rate of evaporation of the LPG to vapor in the system 20.

The system 20 includes a vertical float tank 76 into which the LPG vapor stream flows through the piping 74. The vertical float tank 76 includes a lower volume portion for the collection of LPG in liquid form that collects by gravity, and an upper volume portion for the collection of LPG in vapor form, and a vapor outlet tube 176 in fluid communication with the upper volume portion. The vertical float tank 76 includes a pressure relief valve 77 in fluid communication with the vertical float tank 76 for protection against over pressurization of the vertical float tank 76, and a drain valve 78 is typically a manually-operated hand valve connected to a bottom portion of the vertical float tank 76. The vertical float tank 76 includes a float switch 79 that detects if and when a liquid level of LPG within the interior chamber exceeds a predetermined or preset height. The flow switch 79 activates the closing of the electrically operated valve 42 when the liquid level is exceeded. This prevents a further flow of cold-side LPG into the system 20 from the unspent containers 22, and more importantly maintains a sufficient vapor headspace in the vertical float tank 76 to prevent any liquid LPG from being drawn into the vapor outlet tube 176 and flowing to the compressor 50. The float switch 79 can include a liquid level indicator that can be visible to an operator.

The outlet tube 176 of the vertical float tank 76 is connected via piping 80 in fluid communication with a fluid inlet, or suction side, of the compressor 50. The compressor can be powered by a generator 51 that can be mounted on the trailer 24 and fueled using reclaimed LPG. The compressor 50 compresses a stream of the inlet cold-side LPG vapor, typically at about ambient temperature and at or near 0 psig, and discharges an outlet stream of pressurized hot-side LPG vapor, typically at a pressure up to about 250 psig, and a temperature of about 140°-150° F. (60° -65° C.). At this condition, the liquid-vapor state is essentially completely vapor. Under ordinary conditions, the temperature of the hot-side LPG fluid needs to be reduced significantly in order for the LPG fluid to condense into a liquid-rich LPG stream for filling the fill containers 95.

To achieve a reduction in the temperature of the pressurized LPG stream, this hot-side LPG fluid is passed through the shell-side (hot side) of the one or more heat exchangers 44,52. As described above, the hot, pressurized stream of hot-side LPG fluid flows through the shell-side of the first heat exchanger 44, and the second heat exchanger 52, to heat the cold-side LPG fluid flowing through the tubes 145 of the heat exchangers 44,52, while being concurrently cooled, which reduces the temperature of the hot-side LPF fluid, and shifts the two-phase (liquid/vapor) state of the hot-side LPG toward the more liquid-rich phase state.

In the illustrated system, piping 82 connects the pressurized hot-side LPG to the shell-side fluid inlet of the second heat exchanger 52, passing through the shell side thereof, and then passes through piping 85 to the shell-side fluid inlet of the first heat exchanger 44, passing through the shell side thereof. After passing from the shell-side fluid outlet of the first heat exchanger 44, the stream flows through piping 88 to a manifold 90, which includes a plurality of fill stations for filling the fill containers 95. In an alternative embodiment, the hot-side LPG from the compressor 50 can first be passed to the shell side of the first heat exchanger 44, and then to the shell side of the second heat exchanger 52. A check valve 83 is installed into the piping 82 at the shell-side fluid inlet of the second heat exchanger 52, and excess flow valves 84, 86, 87 are installed in piping 85, between the second heat exchanger 52 and the first heat exchanger 44, and at the shell-side fluid outlet of the first heat exchanger 44 in piping 88. An additional excess flow valve 89 is positioned upstream of the fill manifold 90, and can be connected directly to the fill manifold 90, or alternatively, can be in fluid communication with the fill manifold 90 via a piping 91.

The system 20 can also include an excess flow valve 92, which can be in fluid communication with the fill manifold 90, either directly, or via a conduit such as conduit 91. System 20 can include a high pressure, pressure switch 93 (S), which can be downstream of, and in fluid communication with, the excess flow valve 92, for example, via piping 94. System 20 can also include a pressure relief valve 101 and a pressure gauge 102, and each can be in fluid communication with the fill manifold 90. The system 20 also includes one or more fill tanks 95, which can be configured to receive the condensed liquid phase of the LPG, for subsequent use. The volume of each of the fill tanks 95 can be significantly greater than the volume of each of the bottle containers 22. In the illustrated embodiment, the system 20 includes four of the fill tanks 95. However, the system 20 can include less than, or more than, four fill tanks 95.

Each of the fill tanks 95 can be in selective fluid communication with the fill manifold 90. For example, for each of the fill tanks 95, the system 20 can include an associated excess flow valve 96, a manually operated valve 97, a pressure relief valve 98 (R), and a manually operated valve 99. Each of the manually-operated valves 97 can be positioned downstream of the respective excess flow valve 96. Each valve 97 can be connected directly to the corresponding excess flow valve 96, or can be connected to via a conduit. System 20 can also include a conduit 100 for each of the fill tanks 95. Each of the pressure relief valves 98 can be installed into the conduit 100 can prevent over pressurization, and disposed downstream of the respective manually operated valve 97, for isolating the fill containers from the system 20, and upstream of the respective manually operated valve 99. Each of the manually operated valves 99 can be disposed in close proximity to a respective one of the fill tanks 95, which can facilitate replacing a fill tank 95 containing LPG, with an empty fill tank 95.

If the pressure switch 93 (S) senses a pressure of the hot-side LPG that is greater than a predetermined set point of the pressure switch 93, such as by causing an electrical circuit to be completed, an audible and/or visible alarm can be produced by one or more annunciators. The alarm indicates to an operator of system 20 that the fill tanks 95 can be full, or at least substantially full.

In one embodiment of the invention, hot-side LPG fluid can be placed into fluid communication with a heat exchanger in the reclaim station 26 to use the high temperature and heat of the hot-side LPG fluid to help warm the support platform 30 of the reclaim station 26, and to effect cooling of the hot-side LPG fluid itself. As described above, the operation of the compressor 50 draws a vacuum upon the cold-side piping system, which increases the rate of evaporation of any liquid LPG in the cold-side system, including within the LPG containers 22 placed into fluid communication with the cold-side piping system. The rapid evaporation of LPG liquid through the discharge valve of the LPG container 22 results in a significant drop in temperature at the discharge valve. In most weather conditions, moisture in the atmosphere condenses and then freezes into ice on the outside of the bottle's discharge valve and lower end of the bottle container 22. The ice can further insulate the discharge valve from the ambient environment.

In one example of this embodiment, the piping 81 from the outlet of the compressor 50 is connected in fluid communication to a reclaim heat exchanger that is embedded or disposed within the support platform 30 of the reclaim station 26, as shown in FIGS. 4, 5, 6 and 7. In the illustrated embodiment, the reclaim heat exchange can include a length of a coil 39 passing proximate to the several bottle stations of the support platform 30. In the illustrated embodiment, the coil 39 can have a serpentine shape, which maneuvers around each of the openings 25 in the support platform 30. In other embodiments, a coil can be used that has a shape that is different than the serpentine shape of coil 39. In one non-limiting example, the coil 39 can make two or more passes along the length of the support platform 30. In yet other embodiments, multiple coils can be used in lieu of coil 39, with each coil being in fluid communication with the conduit 81. The temperature of the hot-side LPG discharging from the compressor 50 into the coil 39 is significantly higher than the temperature of the cold-side LPG flowing through the conduit 80 into the fluid inlet of the compressor 50, which results in a significant exchange of heat, and a temperature reduction and increase in the hot-side LPG and cold-side LPG, respectively.

Figure 6:
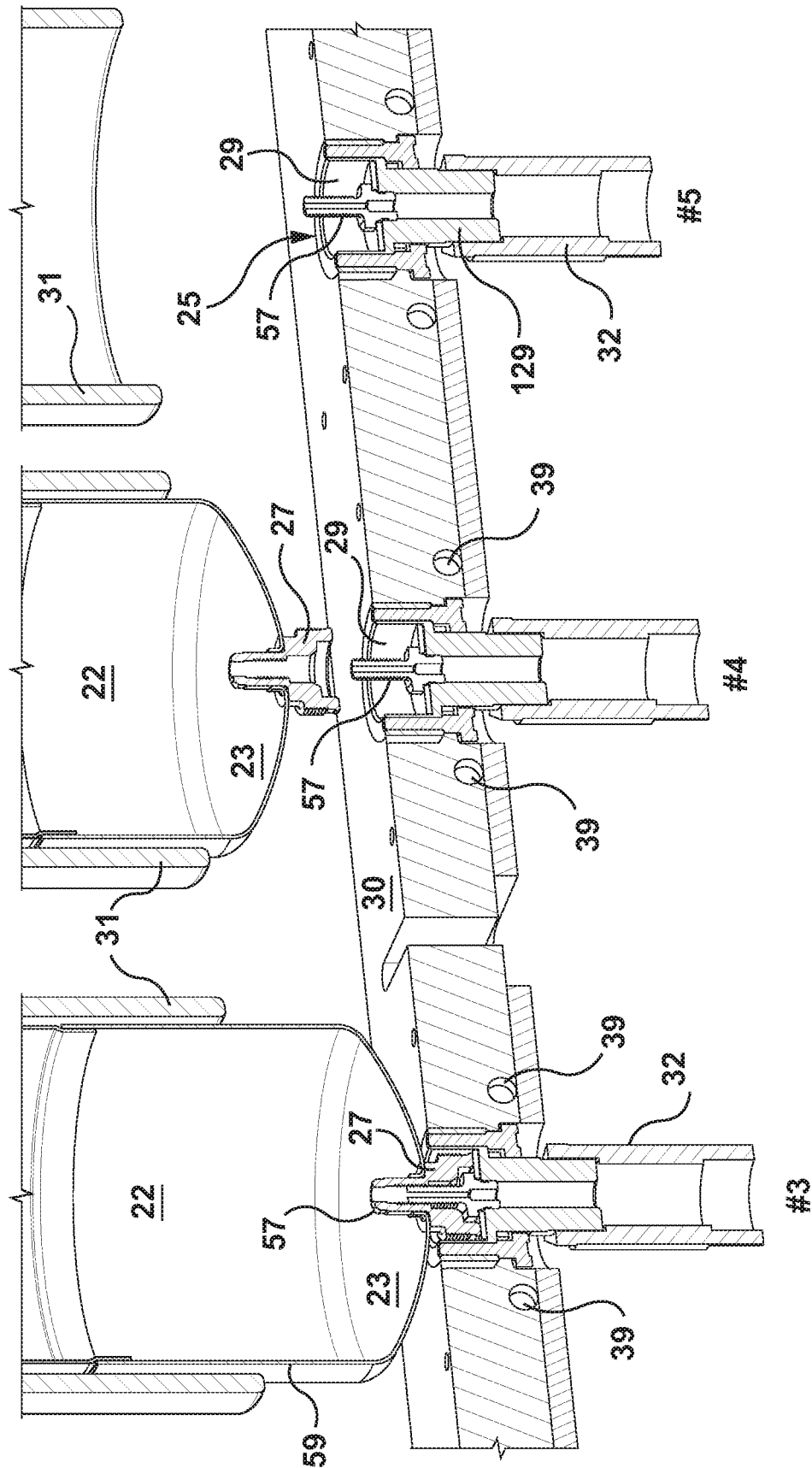
FIG. 6 shows a detailed cross-sectional view of a shutoff valve, the support platform, and the evacuation needle, taken through line 6-6 of FIG. 5.
Figure 7:
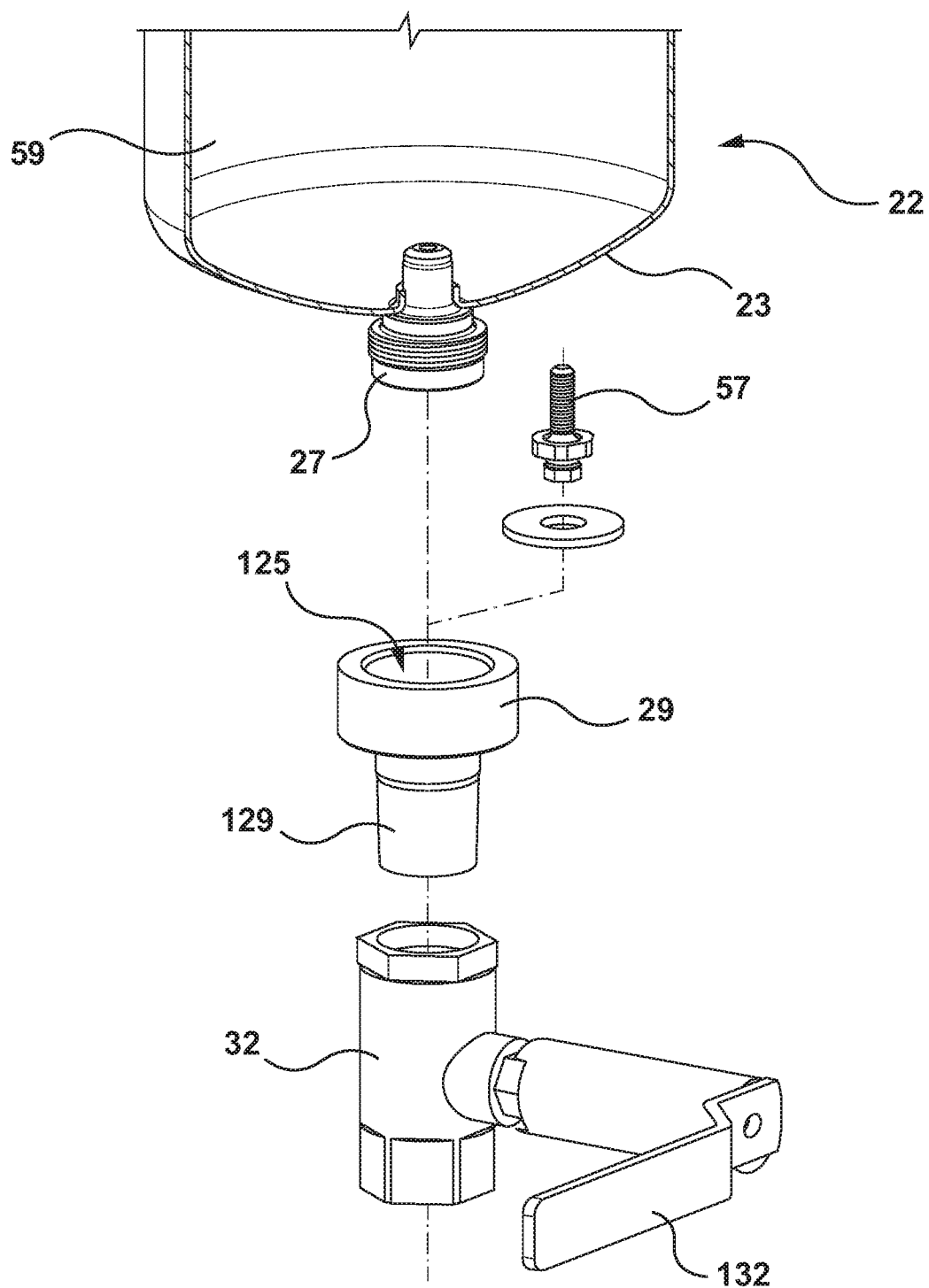
FIG. 7 shows an exploded view of the piping hardware of a reclaim station, including the cylinder valve housing, an adaptor with evacuation needle that connects to the cylinder valve housing, and a reclaim shutoff valve.

Referring to FIGS. 6 and 7, bottle containers 22 has a main valve housing 27 that has a discharge valve that is positioned at a top end of the bottle container in its normal use and storage condition. In the reclaim operation, the bottle container 22 is inverted, so that the top end 23 faces downward, and is placed proximate to or in contact with the upper surface of the support platform 30. Each bottle station of the support platform 30 has an opening 25 (shown at station #5 of FIG. 6, in cross section), into which is placed a cylindrical adaptor 29 having a lower end 129 that extends through the bottom of the support platform 30. One end of the hand valve 32 is connected sealingly to the lower end 129. An adaptor 29 is formed into the top surface of the support platform, and can be sized to engage and retain the support platform 30 in a line-to-line fit, or press fit, to enhance conduction heat transfer between the adaptors 29 and the support platform 30. Each adapter 29 can also be fastened to the support platform 30, which can further secure the attachment of the adapters 29 to the support platform 30. The adaptor 29 includes an opening or countersink 125 that is configured to accept and support the main valve housing 27 of the bottle container 22. The adapter 29 also includes an evacuation needle 57 that can extend into a passage within the main valve housing 27 of the bottle container, to activate opening of the outlet valve by well-known means, which permits the LPG fluid (vapor and/or liquid) inside from the container 22 to discharge.

Station #4 shows a bottle container 22 being lowered down through the receptacle 31 with the main valve housing 27 of the inverted bottle container positioned about the opening 125 of the adaptor 29. Station #3 shows a bottle container 22 with its main valve housing 27 lowered down into engagement with the adaptor 29, positioned for the evacuation needle 57 to activate opening of the outlet valve in the main valve housing 27 to dispense LPG fluid from the container 22.

The hot-side LPG flowing through coil 39 transfers heat into the support platform, and increases the temperature of the support platform 30, relative to ambient. The heat is then transferred to each adapter 29, which in turns warms the main valve housing 27 of the bottle container. With the bottle container 22 inverted, the heat from the support platform 30 also transfers into the wall 59 of the upper portion 23 of the inverted bottle container 22. The hot-side LPG fluid flowing through the coil 39 helps to reduce or prevent the build-up of frost and ice on the main valve housings 27 of the containers 22, and on the valves 32 and the check valves 34 of the cold-side flow system.

The outlet end of the coil 39 embedded in the support platform 30 is connected by piping 82 to one or more heat exchangers, as previously described.

Figure 8:
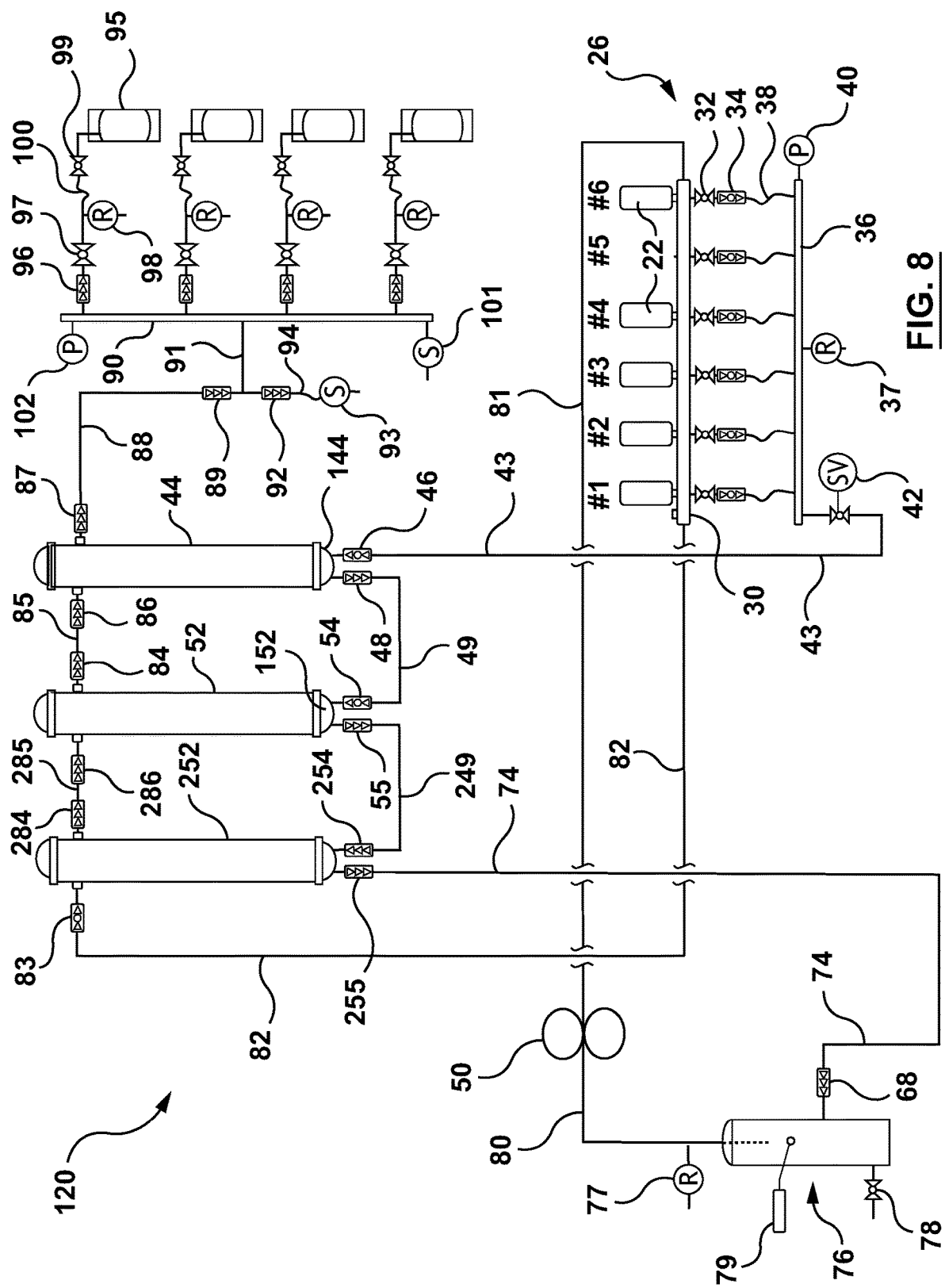
FIG. 8 shows a schematic representation of an alternative system for reclaiming liquefied petroleum gas, according to another embodiment.

FIG. 8 is a schematic representation of a system 120 for reclaiming LPG according to another embodiment. System 120 can be the same as, or similar to, system 20, with one or more differences. System 120 can include a first heat exchanger 44 and a second heat exchanger 52 downstream on the cold side of the LPG fluid stream, similar to the system 20. Heat exchangers 44 and 52 can have the same, or different, sizes. However, system 120 also includes a third heat exchanger 252, which can be positioned downstream on the cold side of the LPG fluid stream from the heat exchanger 44 and the heat exchanger 52 and connected with the heat exchanger 44 and the heat exchanger 52 by piping 285 and with valves 254, 255, 284, 286. The size, design and capacity of heat exchanger 252 can be the same as either one of the heat exchangers 44 and 52, or can be a different size, design or capacity. Also, system 120 does not include the lower and upper separation tanks used in system 20.

Use of systems 20 and 120 for reclaiming liquefied petroleum gas (LPG) can result in various advantages. These advantages include the ability to safely, efficiently and expeditiously reclaim LPG from used containers that have been discarded, but contain residual LPG. The reclaimed LPG can be transferred into fill tanks or containers for subsequent use.

Systems 20 and 120 can be mounted on a mobile device, e.g., a trailer such as trailer 24. This permits the convenient transport of the systems 20 and 120 among multiple container collection locations within a park, or among multiple parks. It will be appreciated that systems 20 and 120 can be advantageously used in other locations, for example commercial facilities, and can be advantageously used whether these systems 20 and 120 are mounted on a mobile device (e.g., 24) or a stationary structure. Also, additional fill tanks (e.g., 95) can be mounted on the trailer (e.g., 24), for convenience, and the trailer (e.g., 24) can be "self-sufficient" as the reclaimed LPG contained in one or more of the fill tanks (e.g., 95) can be used as fuel for the generator (e.g., 51) that powers the compressor (e.g., 50) of the system. One or more "hole-piercing and crusher devices" can also be mounted on the mobile device, such as trailer 24, as preparation for recycling the used and discarded containers (e.g., 22) after reclaiming residual LPG within the containers.

In accordance with the invention, the cold-side LPG discharging from the discarded containers (e.g., 22) mounted on the reclaim station (e.g., 26) can be in a two phase state, with both a liquid portion and a vapor portion in a proportion based on temperature and absolute pressure. Systems 20 and 120 are configured such that the cold-side LPG is initially heated to promote the conversion to LPG vapor for pressurizing and heating with a compressor, and then cooled as it flows to fill tanks (e.g., 95). The LPG flowing into the fill tanks (e.g., 95) is typically in a two-phase state of both liquid and vapor, which facilitates filling the fill tanks (e.g., 95).

Use of multiple heat exchangers (e.g., 44 and 52 of system 20; and 44, 52 and 252 of system 120) increases mass evaporation rate of the LPG, and improves the reliability that the LPG will be in a single vapor phase prior to entering the suction side of the compressor (e.g., 50). Additionally, the use of multiple heat exchangers can result in multiple ranges of target temperatures of the LPG as it discharges to the downstream one of the exchangers, as compared to the use of a single heat exchanger.

EXAMPLE

In an example of the invention, a trailer is provided that supports a reclaim system that mounts on the trailer for reclaiming liquid petroleum gas from unused and unspent fuel cylinders, substantially as shown in FIG. 1. The cold-side system includes a reclaim station, substantially as shown in FIGS. 4-6, a first shell-and-tube heat exchanger and a second shell-and-tube heat exchanger, substantially as shown in FIG. 3, and a compressor. During a steady state operation of the reclaim system at an ambient temperature of about 70° F. and an altitude of about 5,500 feet, the cold-side flow system operates at about 0 psig pressure, and the cold-side LPG fluid has the following temperatures:
  i) at the exit of the main valve housing 27 of the inverted cylinder (22), 20° F.,
  ii) at the reclaim manifold (36), 40° F.,
  iii) at the outlet of the cold side of the first heat exchanger (44), 65° F., and
  iv) at the outlet of the cold side of the second heat exchanger (44), and entering the compressor, 85° F.

The hot-side LPG fluid has the following temperatures:
  i) at the outlet of the compressor (50), 145° F.,
  ii) at the outlet of the heat exchanger of the support platform (30), 125° F.,
  iii) at the outlet of the hot side of the second heat exchanger (52), 105° F., and
  iv) at the outlet of the hot side of the first heat exchanger (44), and the refill manifold (90), 80° F.

While various embodiments of a system, and a method of using the system, for reclaiming liquefied, or liquid, petroleum gas have been illustrated by the foregoing description and have been described in considerable detail, additional advantages and modifications will be readily apparent to those skilled in the art.

What is claimed is:

1. An LPG reclaim system for withdrawing and reclaiming liquefied petroleum gas (LPG) from one or more LPG bottle containers, comprising:
   a reclaim station for reclaiming LPG in liquid form from the one or more LPG bottle containers;
   a compressor for pressurizing LPG in vapor form;
   a receiving tank for receiving pressurized LPG in liquid form;
   one or more heat exchangers that include a cold side and a hot side;
   a cold-side flow system, connecting the reclaim station to an inlet of the compressor, while passing the reclaimed LPG as a cold-side fluid through the cold side of the one or more heat exchangers,
   wherein a partial vacuum in the cold-side flow system resulting from operation of the compressor evaporates at least a portion of LPG in liquid form from the cold-side fluid into LPG in vapor form; and
   a hot-side flow system, connecting an outlet of the compressor to the receiving tank, while passing the pressurized LPG as a hot-side fluid through the hot side of the one or more heat exchangers,
   wherein heat from the hot-side fluid on the hot side of the one or more heat exchangers is transferred to the cold-side fluid on the cold side of the one or more heat exchangers, and
   wherein transference of heat from the hot-side fluid to the cold-side fluid substantially evaporates remaining LPG in liquid form from the cold-side fluid into LPG in vapor form to be pressurized by the compressor, and substantially condenses pressurized LPG in vapor form from the hot-side fluid into LPG in liquid form for receipt by the receiving tank.

2. The LPG reclaim system according to claim 1, wherein the one or more heat exchangers includes two or more heat exchangers.

3. The LPG reclaim system according to claim 2, wherein the cold-side fluid passes in series through the cold side of each of the two or more heat exchangers, and the hot-side fluid passes in series through the hot side of each of the two or more heat exchangers.

4. The LPG reclaim system according to claim 1, wherein the cold-side flow system includes
   a manifold for receiving a reclaimed quantity of LPG from the one or more LPG bottle containers,
   a vertical float tank that includes a lower volume portion for the collection of LPG in liquid form that collects by gravity, and an upper volume portion for the collection of LPG in vapor form, and a vapor outlet tube in fluid communication with the upper volume portion, and
   piping for connecting the manifold to an inlet of the cold side of the one or more heat exchangers, for connecting an outlet of the cold side of the one or more heat exchangers to an inlet of the vertical float tank, and for connecting the vapor outlet tube of the vertical float tank to the compressor.

5. The LPG reclaim system according to claim 4, wherein the cold-side flow system further includes one or more fluid separation tanks having a volume and configured to separate a liquid portion of the LPG that collects under gravity in a lower portion of the volume from a vapor portion of the LPG in an upper portion of the volume, and further including piping for connecting the upper portion of the volume of the fluid separation tank to an inlet of the compressor.

6. The LPG reclaim system according to claim 1, further comprising a support platform that includes a plurality of bottle stations for mounting inverted LPG bottle containers, wherein an outlet valve of each of the one or more LPG bottle containers is retained in one of a plurality of openings in the support platform that define the plurality of bottle stations.

7. The LPG reclaim system according to claim 6, wherein the support platform further includes a reclaim heat exchanger, the reclaim heat exchanger including a length of a coil passing proximate to each of the bottle stations of the support platform, and configured and shaped to pass near or around the openings in the support platform, and wherein an inlet end and an outlet end of the coil are placed into fluid communication with the hot-side flow system, for passing hot-side fluid through the coil.

8. The LPG reclaim system according to claim 1, further comprising:
   a generator configured to provide power to the compressor;
   wherein a portion of the pressurized LPG in liquid form is usable by the generator to generate power provided to the compressor.

9. The method according to claim 8, wherein the cold-side flow system further includes one or more fluid separation tanks each having a volume and configured to separate a liquid portion of the LPG that collects under gravity in a lower portion of the volume from a vapor portion of the LPG in an upper portion of the volume, and piping for connecting the upper portion of the volume of the fluid separation tank to an inlet of the compressor.

10. The LPG reclaim system according to claim 1, wherein each of the one or more heat exchangers comprise a shell-and-tube heat exchanger including a tube side and a shell side, and wherein the cold-side fluid passes through the tube side of the shell-and-tube heat exchanger, and the hot-side fluid passes through the shell side of the shell-and-tube heat exchanger.

11. The LPG reclaim system according to claim 1, wherein the cold-side flow system and the hot-side flow system further include at least one of a pressure switch or a pressure transducer configured to detect a pressure or vacuum, wherein the pressure switch or the pressure transducer can be configured to account for the altitude of the location of the LPG reclaim system.

12. The LPG reclaim system according to claim 1, further comprising:
an apparatus adapted to pierce and crush the one or more LPG bottle containers; and
a trailer, wherein the reclaim station, the compressor, the receiving tank, the one or more heat exchangers, the cold-side flow system, the hot-side flow system, and the apparatus are mounted on the trailer.

13. A reclaim station for reclaiming unspent liquefied petroleum gas (LPG) from LPG bottle containers, including:
a support platform that includes a support body having a plurality of bottle stations for mounting inverted LPG bottle containers, the support body having a plurality of openings in the support platform that define a plurality of bottle stations; and
a plurality of adapters each fastened to the support platform via a respective opening from the plurality of openings and configured to accept and support a valve housing of an inverted LPG bottle container, and including an evacuation needle that can extend into a passage within the valve housing of the inverted bottle container for draining LPG from the LPG bottle container,
wherein the support platform further includes a reclaim heat exchanger, the reclaim heat exchanger including a length of a coil passing proximate to the plurality of bottle stations, and configured and shaped to pass near or around the openings in the support body, the coil including an inlet end and an outlet end in fluid communication with a hot-side fluid flow system for passing a hot-side fluid comprising the LPG from the LPG bottle container that has been heated and compressed through the coil.

* * * * *